(12) United States Patent
Santa et al.

(10) Patent No.: US 9,887,866 B2
(45) Date of Patent: *Feb. 6, 2018

(54) METHOD AND APPARATUS FOR CONVERTING ANALOG RADIO FREQUENCY (RF) SIGNALS TO THE DIGITAL DOMAIN IN A MULTIBAND AND MULTICARRIER WIRELESS COMMUNICATION SYSTEM

(71) Applicant: MAXLINEAR ASIA SINGAPORE PTE LTD., Singapore (SG)

(72) Inventors: Ryan Santa, Ottawa (CA); Bernard Guay, Vancouver (CA)

(73) Assignee: MAXLINEAR ASIA SINGAPORE PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,812

(22) Filed: Sep. 1, 2016

(65) Prior Publication Data
US 2017/0118059 A1   Apr. 27, 2017

Related U.S. Application Data

(63) Continuation of application No. 14/570,640, filed on Dec. 15, 2014, now Pat. No. 9,438,458.
(Continued)

(51) Int. Cl.
H04L 27/26 (2006.01)
H04B 1/707 (2011.01)
(Continued)

(52) U.S. Cl.
CPC ....... *H04L 27/2647* (2013.01); *H04B 1/0017* (2013.01); *H04B 1/707* (2013.01);
(Continued)

(58) Field of Classification Search
None
See application file for complete search history.

(56) References Cited

U.S. PATENT DOCUMENTS 9,438,458 B1 * 9/2016 Santa .................. H04L 27/2647
2009/0110033 A1 * 4/2009 Shattil .................. H04B 1/7174
375/141

(Continued)

*Primary Examiner* — Leon-Viet Nguyen
(74) *Attorney, Agent, or Firm* — McAndrews, Held & Malloy, Ltd.

(57) ABSTRACT

Methods and systems are provided for converting wideband analog radio frequency (RF) signals. In an implementation, a first wideband analog RF signal may be received and handled. The first wideband analog RF signal comprises one or more first narrowband analog RF signals, with a total of bandwidths of the one or more first narrowband analog RF signals is less than a total bandwidth of the first wideband analog RF signal. Handling the first wideband analog RF signal may including selecting a first subset of analog-to-digital converters (ADCs) from a plurality of analog-to-digital converters (ADCs), with the number of ADCs in the first subset of ADCs being less than a total number of ADCs in the plurality of ADCs, and only the first subset of ADCs may be enabled. Only the one or more first narrowband analog RF signals may be analog-to-digital converted via the first subset of ADCs.

20 Claims, 6 Drawing Sheets

Related U.S. Application Data

(60) Provisional application No. 61/940,127, filed on Feb. 14, 2014.

(51) Int. Cl.
  *H04B 1/00* (2006.01)
  *H04L 5/00* (2006.01)
  *H04L 25/03* (2006.01)
  *H04L 27/233* (2006.01)

(52) U.S. Cl.
  CPC ........ *H04L 5/001* (2013.01); *H04L 25/03012* (2013.01); *H04L 27/2334* (2013.01)

(56) References Cited

U.S. PATENT DOCUMENTS

| | | |
|---|---|---|
| 2010/0135446 A1 | 6/2010 | Han et al. |
| 2011/0105068 A1 | 5/2011 | Reddy et al. |
| 2012/0093039 A1 | 4/2012 | Rofougaran et al. |
| 2012/0155347 A1 | 6/2012 | Husted et al. |
| 2013/0039444 A1* | 2/2013 | Porret .................... H04B 1/006 375/316 |

* cited by examiner

METHOD AND APPARATUS FOR CONVERTING ANALOG RADIO FREQUENCY (RF) SIGNALS TO THE DIGITAL DOMAIN IN A MULTIBAND AND MULTICARRIER WIRELESS COMMUNICATION SYSTEM

CLAIM OF PRIORITY

This patent application a continuation of U.S. patent application Ser. No. 14/570,640, filed on Dec. 15, 2014, which in turn makes reference to, claims priority to and claims benefit from U.S. Provisional Patent Application Ser. No. 61/940,127 filed Feb. 14, 2014. Each of the above identified applications is hereby incorporated herein by reference in its entirety.

FIELD

The present disclosure generally relates to wireless communications systems. In particular, the present disclosure relates to a method and system for converting wideband analog radio frequency (RF) signals to the digital domain in a multi band and multicarrier wireless communications system.

BACKGROUND

Today's wireless communication systems generally use a single radio frequency (RF) band, having a bandwidth anywhere from less than 5 MHz to over 200 MHz, to transmit and receive data. These wireless communication systems are generally capable of transmitting multiple RF carriers in one RF band.

The Federal Communications Commission (FCC) in the United States, and their equivalent organizations in other countries, continue to free up new RF bands, which is creating new requirements for both industry standards organizations, such as the 3rd Generation Partnership Project (3GPP) and cellular operators, for advanced wireless communication systems that can efficiently use these new RF bands.

Figure 1A:
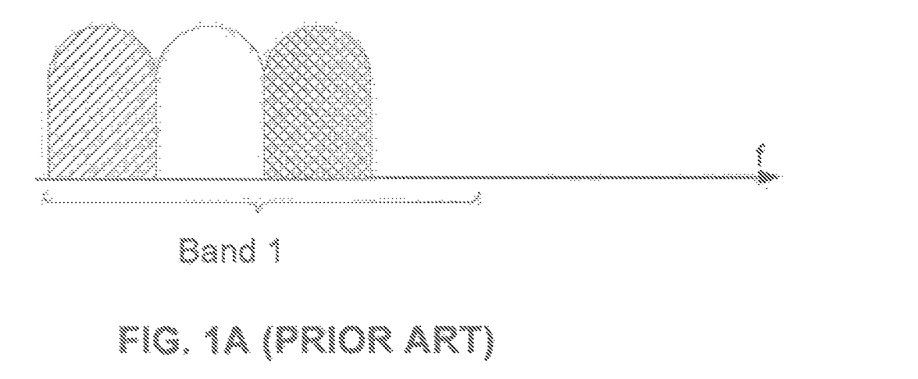
FIG. 1A is a graph illustrating power spectral density versus frequency of three transmitted RF signals modulated on three contiguous carriers in a single RF band for a known multicarrier and multiband wireless communication system.
Figure 1B:
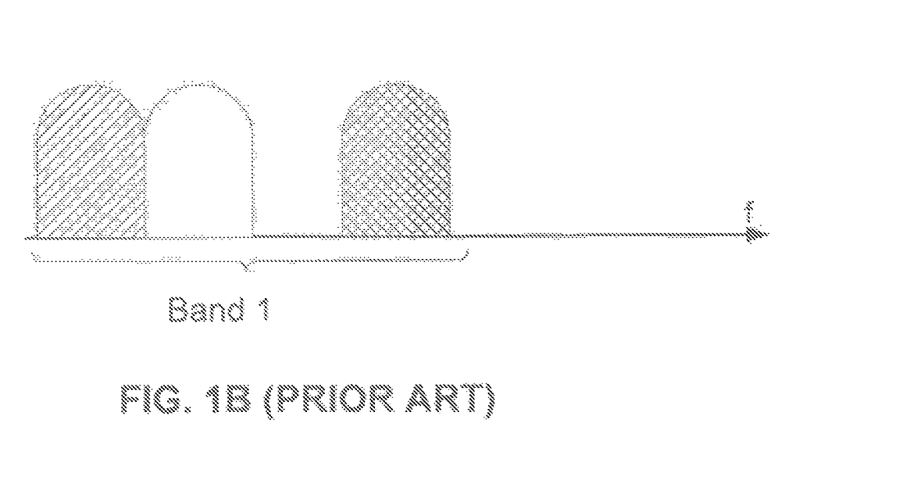
FIG. 1B is a graph illustrating power spectral density versus frequency of a three transmitted RF signals modulated on two contiguous carriers and one disjoint carrier in a single RF band for a known multicarrier and multiband wireless communication system.
Figure 1C:
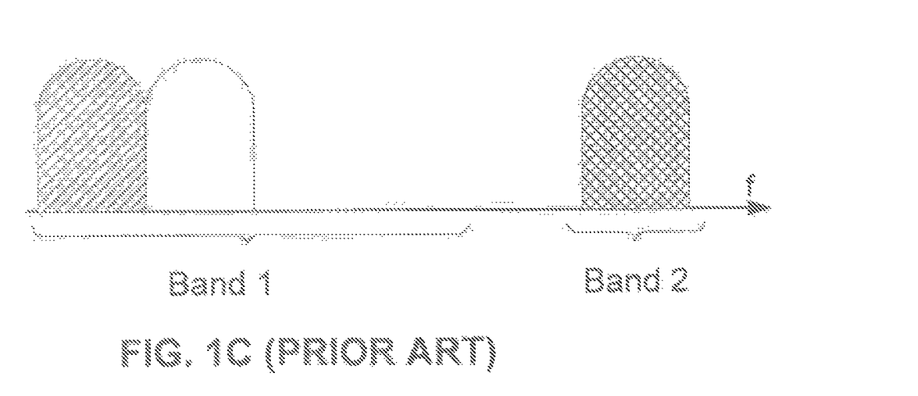
FIG. 1C is a graph illustrating power spectral density versus frequency of a two transmitted RF signals modulated on two contiguous carriers in one RF band and one transmitted RF signal modulated a carrier in another RF band known multicarrier and multiband wireless communication system.

Today's wireless communications standards generally utilize two multiplexing techniques. For example, the GSM and CDMA standards utilize Frequency Domain Duplex (FDD) multiplexing techniques. The WiFi and WiMAX standards utilize Time Domain Duplex (TDD) multiplexing techniques and use a single RF carrier in one RF band. New developments in wireless communications standards that use TDD multiplexing, such as WiFi (802.11ac) and Long-Term Evolution (LTE), specify the transmission and reception of data over multiple RF bands where each RF band has one or more RF carriers. The multiple RF carriers may be contiguous in one RF band (i.e., intra band contiguous), non-contiguous in one RF band (i.e., intra band non-contiguous,) or non-contiguous in two RF bands (i.e., inter band non-continuous). FIG. 1A shows three contiguous RF carriers in a single RF band, or intra-band; FIG. 1B shows two contiguous RF carriers and one non-contiguous RF carrier in a single RF band, or intra-band; and FIG. 10 shows two contiguous RF carriers in a first RF band and one RF carrier in a second non-contiguous RF band, or inter-band.

A "brute force" method that is typically used to adapt conventional wireless communication systems to accommodate the requirements of new multi-band wireless communications standards involves implementing separate transceivers for each RF band and transmitting and receiving data in each RF band using a single radio. The "brute force" method, however, limits the ability of an operator of the wireless communications systems to manage power consumption of the radio.

Figure 2A:
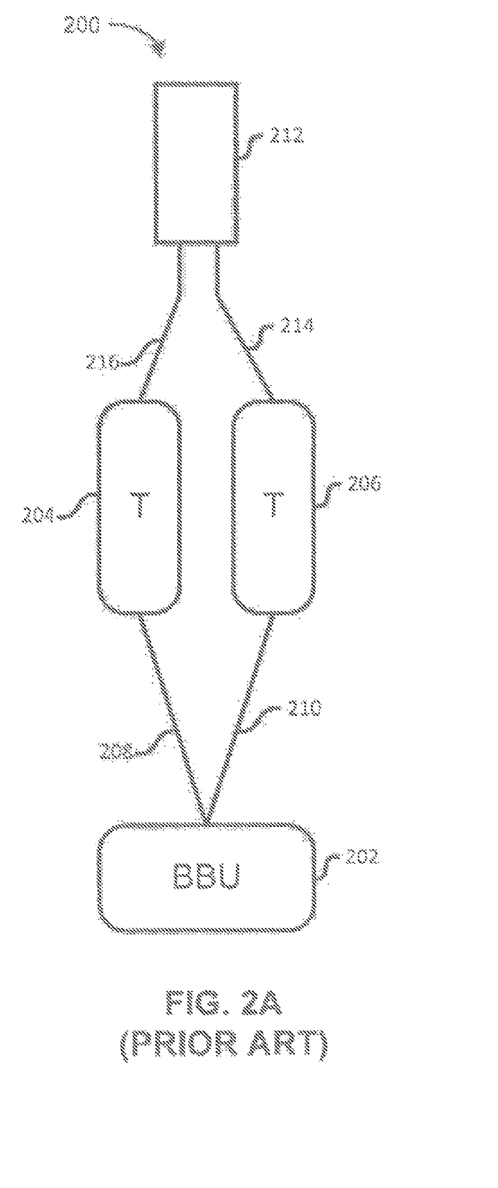
FIGS. 2A and 2B are block diagrams of known multiband and multicarrier wireless communication systems.
Figure 2B:
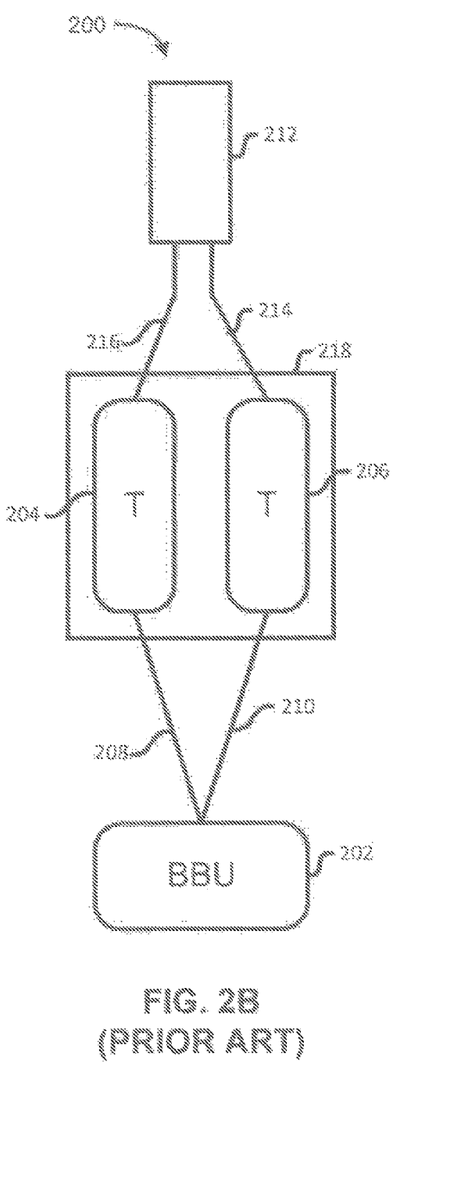

Examples of known multiband and multicarrier wireless communication systems that are capable of transmitting and receiving data in two RF bands using one or more RF carriers are shown in FIG. 2A and FIG. 2B. FIG. 2A and FIG. 2B each show a conventional multiband and multicarrier wireless communication system 200 that includes a baseband unit 202 connected to two separate RF transceivers 204, 206 by optical cables 208, 210. The two RF transceivers 204, 206 are in turn connected to a single multi-band antenna 212 by two RF coax cables 214, 216, respectively. The difference between conventional multiband and multicarrier wireless communication system shown in FIG. 2A and the one shown in FIG. 2B is that the two RF transceivers 204, 206 are packaged into a single box 218 in the conventional multiband and multicarrier wireless communication system shown in FIG. 2.

Each RF transceiver in a conventional multiband and multicarrier wireless communication system, such as those shown in FIG. 2A and FIG. 2B, includes analog-to-digital converters (ADCs) for converting RF signals between the analog and digital domains, and digital-to-analog-converters (DACs) for converting RF signals between the digital and analog domains. When converting an analog signal to the digital domain, to accurately represent that signal it must be sampled at a frequency between 2 to 5 times the bandwidth of the RF signal. Nyquist theory states that sampling at 2 times the bandwidth of the RF signal is required; however often up to 5 times the bandwidth of the analog RF signal is used in order to cancel out harmonics. Changes in wireless standards have resulted in wireless signals increasing in bandwidth that non-contiguously span intra-band and inter-band frequency ranges, requiring ADCs and DACs with increasing sampling rates. These ADCs and DACs are expensive and inefficient in the use of electrical power. Furthermore, the sampling rates of ADCs and DACs are unlikely to keep pace with the demands placed upon them by the evolving wireless standards.

Improvements in the conversion of wideband analog RF signals to the digital domain in multiband and multicarrier wireless systems are therefore desirable.

DETAILED DESCRIPTION

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein. Reference to specific elements of various embodiments of the present disclosure will now be made.

The present disclosure generally relates to a method and system for converting wideband analog radio frequency (RF) signals between the analog and digital domains.

Figure 3:
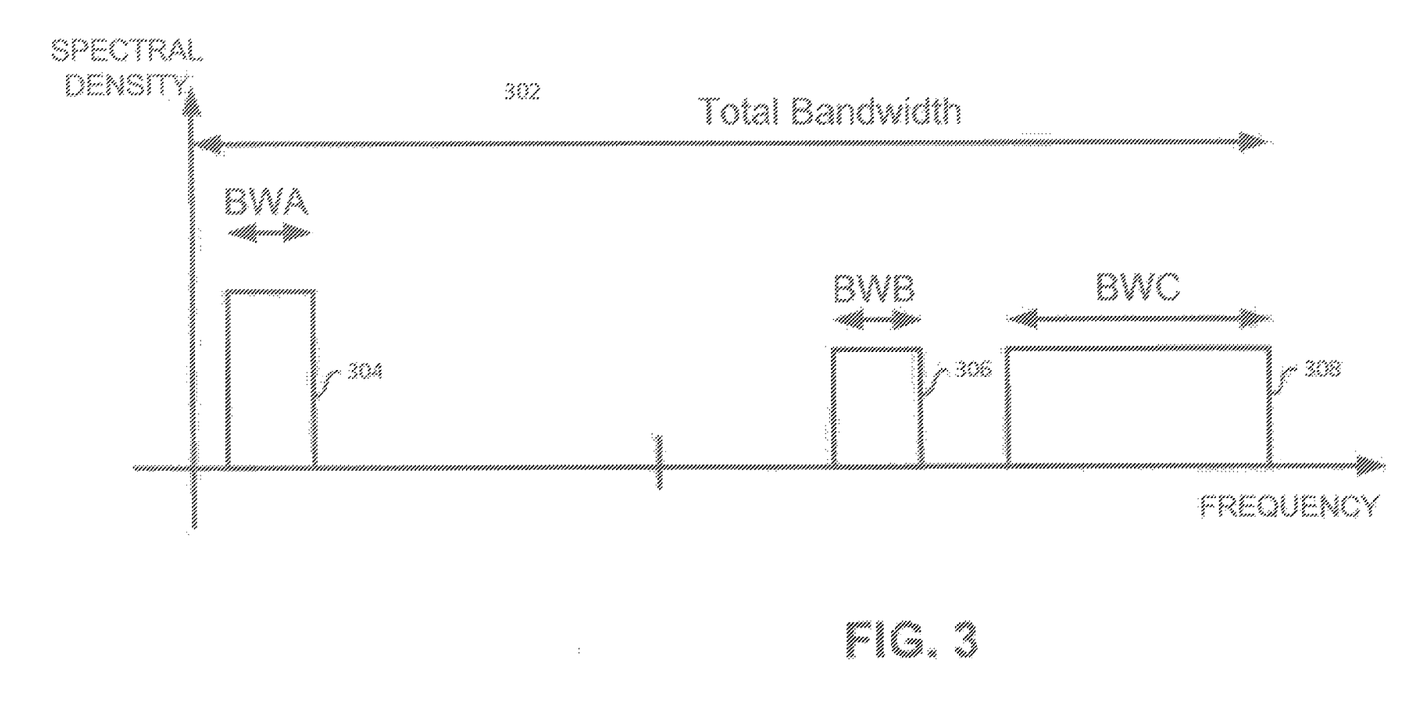
FIG. 3 is a graph illustrating power spectral density versus frequency of a wideband analog RF signal.

The method of the present disclosure takes advantage of the difference between the sum of the bandwidths of narrowband analog RF signals that make up a wideband analog RF signal and the total bandwidth of the wideband analog RF signal, as shown in FIG. 3. FIG. 3 shows a graph of the power spectral density versus frequency of an example wideband analog RF signal. The wideband analog RF signal 302 is made up of or includes three narrowband analog RF signals 304, 306, 308. The narrowband analog RF signal 304 has a spectral range or bandwidth BWA, the narrowband analog RF signal 306 has a spectral range or bandwidth BWB, and the narrowband analog RF signal 308 has a spectral range or bandwidth BWC. The total occupied bandwidth of the three narrowband analog signals 304, 306, 308 is equal to the sum of BWA, BWB and BWC, and is always less that the total bandwidth of the wideband analog RF signal 302.

The present disclosure provides a method and system that tracks the occupied bandwidth of the narrowband analog RF signals that make up a wideband analog RF signal rather than a total bandwidth of the wideband analog RF signal.

Figure 4:
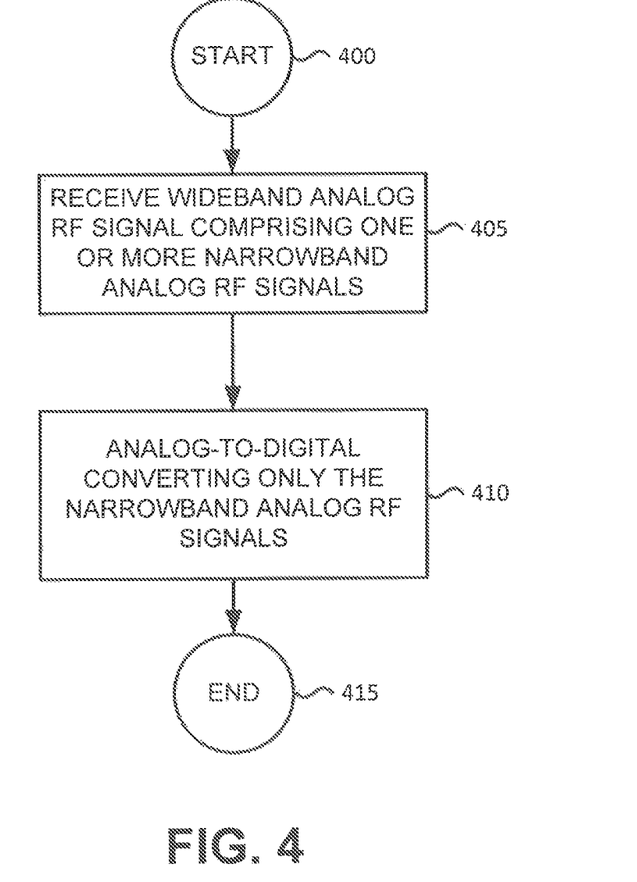
FIG. 4 is a flowchart illustrating a method of converting wideband analog RF signals to the digital domain in accordance with an embodiment of the present disclosure.

A flowchart illustrating a method of converting wideband analog RF signals to the digital domain according to an embodiment of the present disclosure is shown in FIG. 4. The method is performed by an analog-to-digital conversion system that is implemented in a RF transceiver of a multiband and multicarrier wireless communication system.

The method begins at 400 and proceeds to step 405. At step 405, a wideband analog RF signal is received. The wideband analog RF signal that is received includes one or more narrowband analog RF signals. Each narrowband analog RF signal occupies a distinct non-overlapping spectral band within a spectrum of the wideband analog RF signal. After receiving wideband analog RF signal, the method proceeds to step 410. At step 410, the method analog-to-digital converts only the narrowband analog RF signals occupying the distinct non-overlapping spectral bands, and the methods ends at step 415.

In an embodiment, the step 410 of analog-to-digital converting only the narrowband RF analog signals occupying the distinct non-overlapping spectral bands includes separating the one or more narrowband analog RF signals from the wideband analog RF signal.

In another embodiment, separating the one or more narrowband analog RF signals from the wideband analog RF signal, which is part of step 410, includes down converting the first wideband analog RF signal to pairs of orthogonal baseband analog signals using a set of down conversion frequencies, where each down conversion frequency is tuned to a center of one of the distinct non-overlapping spectral bands, and filtering the pairs of orthogonal baseband analog signals to generate a set of filtered orthogonal analog baseband signals, each pair of filtered orthogonal analog baseband signals corresponding to one of the distinct narrowband analog RF signals. In another embodiment, the step 410 of analog-to-digital converting includes converting each pair of filtered orthogonal analog baseband signals to a pair of digital signals.

In another embodiment, the step 410 of analog-to-digital converting includes converting each of the first pairs of filtered orthogonal baseband analog signals to pairs of digital signals. In another embodiment, down converting includes amplifying each of the first pairs of orthogonal baseband analog signals. In still another embodiment, filtering includes filtering the first pairs of amplified orthogonal baseband analog signals to generate the first pairs of filtered orthogonal baseband analog signals.

In another embodiment, the first pairs of orthogonal baseband signals each include a first in-phase baseband signal and a first quadrature baseband signal.

In another embodiment, the method includes, similar to step 405, receiving a second wideband analog RF signal comprising one or more second narrowband RF analog signals, each of the second narrowband analog RF signals occupying a distinct non-overlapping spectral band within a spectrum of the second wideband analog RF signal, wherein the first and second wideband analog RF signals are spectrally non-overlapping. The method further includes, similar to step 410, analog-to-digital converting only the second narrowband RF analog signals occupying the distinct non-overlapping spectral bands within a spectrum of the second wideband analog RF signal.

In another embodiment, analog-to-digital converting only the second narrowband analog RF signals occupying the distinct non-overlapping spectral bands includes separating the one or more second narrowband analog RF signals from the second wideband analog RF signal.

In another embodiment, wherein separating the one or more second narrowband analog RF signals from the second wideband analog RF signal includes down converting the second wideband analog RF signal to second pairs of orthogonal baseband analog signals using a set of down conversion frequencies, where each down conversion frequency is tuned to a center of one of the distinct non-overlapping spectral bands, and filtering the pairs of orthogonal baseband analog signals to generate pairs of filtered orthogonal baseband analog signals, each pair of filtered orthogonal baseband analog signals corresponding to one of the distinct narrowband analog RF signals.

Figure 5:
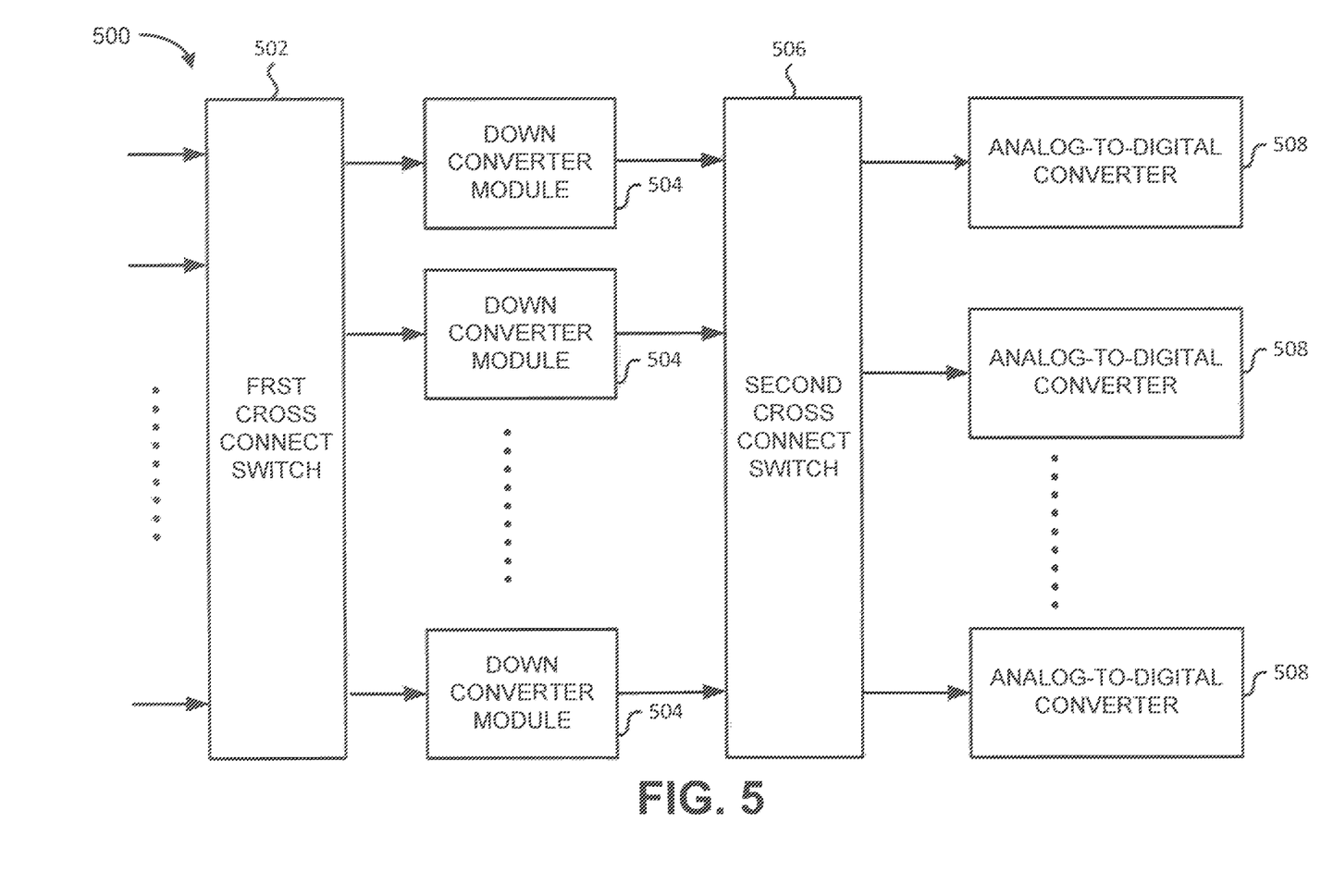
FIG. 5 is a block diagram of an analog-to-digital conversion system for converting analog radio frequency (RF) signals to the digital domain in a multiband and multicarrier wireless communications system in accordance with an embodiment of the present disclosure.

Referring now to FIG. 5, a block diagram of an analog-to-digital conversion system 500 for converting wideband analog radio frequency (RF) signals to a digital domain according to an embodiment of the present disclosure. The analog-to-digital converter system 500 is implemented in an RF transceiver of a multiband and multicarrier wireless and is configurable so that the system 500 can convert up to N wideband analog RF signals to the digital domain. Each of the N wideband analog RF signals can include one or more narrowband analog RF signals. Each of the narrowband analog RF signals occupies a distinct non-overlapping spectral band within a spectral range of its corresponding wideband analog RF signal.

The analog-to-digital conversion system 500 includes a first cross-connect switch 502, N down converter modules 504, a second cross-connect switch 506, and N analog-to-digital converters (ADCs) 508, where N is a positive integer. In an embodiment, the N ADCs are time-interleaved ADCs.

The first cross-connect switch 502 includes N inputs for receiving wideband analog RF signals and N outputs. Each of the N outputs is electrically connected to one of the N down converter modules 504. The first cross-connect switch 502 is configurable to electrically connect any of the N inputs to one or more of the N down converter modules 504. Similarly, the second cross-connect 506 is configurable to electrically connect any one of the down converter modules 504 to one or more of the N ADCs 508. In an implementation, the cross connect switch 502 or 506 can distribute a single input to multiple outputs.

In an embodiment, in operation, the first cross-connect 502 receives a wideband analog RF signal that includes M narrowband analog RF signals, where M is a positive integer. Each of the M narrowband analog RF signals occupies a distinct non-overlapping spectral band within a spectrum of the wideband analog RF signal. The first cross-connect 502 is configured such that the wideband analog RF signal is output to M down converter modules 504. Each of the M down converter modules 504 is tuned a center frequency of one of the distinct non-overlapping bands. The M down converter modules 504 divide or separate only the M analog narrowband RF signals from the wideband analog RF signal and output the M analog narrowband RF signals to a second cross-connect switch 506. The second cross-connect switch 506 is configured to output each of the M analog RF signals to an appropriate ADC module 508. Each appropriate ADC module 508 samples the narrowband analog RF signal it receives and outputs a digital representation of the narrowband analog RF signal for postprocessing into a single digital signal that represent the original wideband analog RF signal.

In an embodiment, ADC modules 508 may be enabled and disabled so that only those ADC modules 508 necessary for converting a wideband analog RF signal are enabled.

Figure 6:
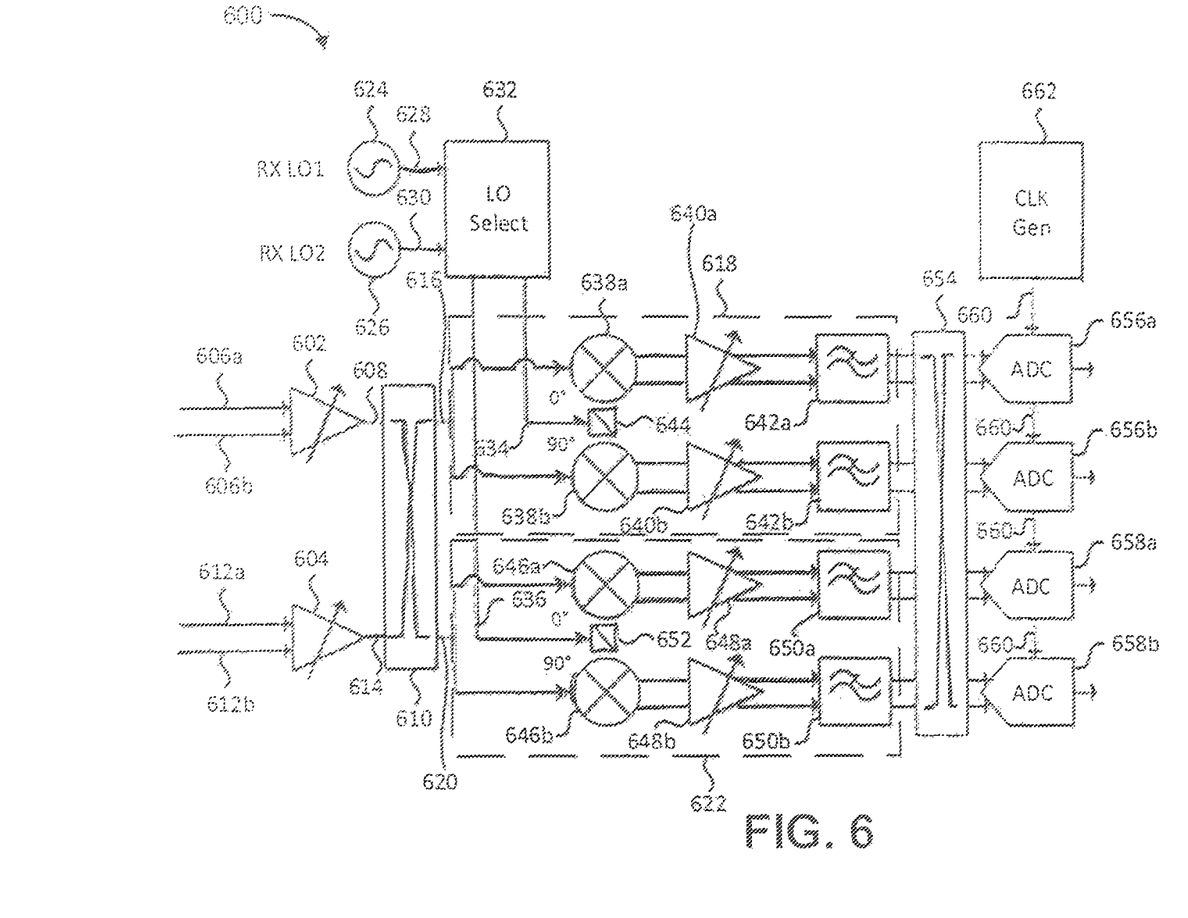
FIG. 6 is a circuit diagram of an analog-to-digital conversion system for converting analog radio frequency (RF) signals to the digital domain in a multiband and multicarrier wireless communications system in accordance with an embodiment of the present disclosure.

FIG. 6 shows a circuit diagram of an analog-to-digital converter system 600 for converting wideband analog signals to the digital domain according to an embodiment of the present disclosure. The analog-to-digital converter system 600 is implemented in an RF transceiver of a multiband and multicarrier wireless communication system and is configurable so that the system 600 can convert up to two wideband analog RF signals to the digital domain. Each of the two wideband analog RF signals can include either one narrowband analog RF signal or two narrowband analog RF signals, where each of the narrowband analog RF signals occupies a distinct non-overlapping spectral band within a spectral range of the wideband analog RF signal.

The system 600 includes a first amplifier 602 and a second amplifier 604. The first amplifier 602 has a pair of inputs 606a, 606b for receiving a first wideband analog RF signal and an output that is electrically connected by 608 to a first input of a first cross-connect 610. The second amplifier 604 also has a pair of inputs 612a, 612b for receiving a second wideband analog RF signal and an output that is electrically connected by 614 to a second input of the first cross-connect 610. In the example embodiment shown in FIG. 6, the first and second wideband analog RF signals are each differential analog RF signals.

The first cross-connect 610 also has a first output that is electrically connected by 616 to a first input of a first down converter module 618 and a second output that is electrically connected by 620 to a first input of a second down converter module 622. The first cross-connect 610 is configurable to electrically connect the output of the first amplifier 602 to: (1) the first input of the first down converter module 618; (2) the first input of the second down converter module 622; or (3) the first input of both the first and second down converter modules 618, 622. Similarly, the first cross-connect 610 is configurable to electrically connect the output of the second amplifier 604 to: (1) the input of the first down converter module 618; (2) the first input second down converter module 622; or (3) the first inputs of both the first and second down converter modules 620, 624. Thus, the first down converter module 618 is capable of receiving the wideband analog RF signal from the output of the first amplifier 602 or the second wideband analog RF signal from the output of the second amplifier 604, depending on the configuration of the first cross-connect 610. Also, the second down converter module 618 is capable of receiving the wideband analog RF signal from the output of the first amplifier 602 or the second wideband analog RF signal from the output of the second amplifier 604, again depending on the configuration of the first cross-connect 610.

Referring again to FIG. 6, the system 600 also includes a first local oscillator 624 for generating a first local oscillator signal and a second local oscillator 626 for generating a second oscillator signal. The first and second local oscillators 624, 626 are electrically connected by 628, 630, respectively, to a local oscillator selector 632. The local oscillator selector 632 is configurable to electrically connect, by 634, one of the first oscillator signal generated by the first local oscillator 624 and the second oscillator signal generated by the second local oscillator 626 to a second input of the first down converter module 618. The local oscillator selector 632 is also configurable to electrically connect, by 636, one of the first oscillator signal generated the first local oscillator 624 and the second oscillator signal generated by the second local oscillator 626 to a second input of the second down converter module 622.

The first down converter module 618 includes a first pair of mixers 638a, 638b, a first pair of amplifiers 640a, 640b, a first pair of filters 642a, 642b, and a first phase shifter 644. The first phase shift generator 644 receives, by 634, one of the first and second local oscillator signals from the local oscillator selector 632, generates a first in-phase signal and a first quadrature signal from the one of the first and second local oscillator signals, and provides the in-phase and quadrature signals to the mixers 638a, 638b, respectively.

Similarly, the second down converter module 622 includes a second pair of mixers 646a, 646b, a second pair of amplifiers 648a, 648b, a second pair of filters 650a, 650b and a second phase shifter 652. The second phase shift generator 652 receives by 636, one of the first and second local oscillator signals from the local oscillator selector 632, generates a second in-phase signal and a second quadrature signal from the one of the first and second local oscillator signals, and provides the in-phase and quadrature signals to the mixers 648a, 648b, respectively.

The first pair of filters 642*a*, 642*b* is electrical connected to a first pair of inputs of a second cross-connect 654. Similarly, a pair of outputs of the second pair of filters 650*a*, 650*b* is electrically connected to a second pair of inputs of the second cross-connect 654.

The second cross-connect 654 has a first pair of outputs electrically connected to a first pair of analog-to-digital converters 656*a*, 656*b* and a second pair of outputs electrically connected to a second pair of analog-to-digital converters 658*a*, 658*ab*. The second cross-connect 654 is configurable to connect any of the first pair of filters 642*a*, 642*b* and the second pairs of filters 652*a*, 652*b* to any of the first pair of analog-to-digital converters 656*a*, 656*b* and the second pair of analog-to-digital converters 658*a*, 658*b*, respectively. Each pair of analog-to-digital converters, 656*a*, 656*b* and 658*a*, 658*b*, is electrically connected, by 660, to a clock generator 662 for receiving a clock signal that has a frequency of two to five times the bandwidth of any of the narrowband analog RF signal occupying the distinct non-overlapping spectral bands.

An example of the operation of the analog-to-digital converter system 600 will now be described. In this example, the analog-to-digital conversion system 600 receives only one wideband analog RF signal that includes two narrowband analog RF signals. A first narrowband analog RF signal of the two narrowband analog RF signals occupies a first non-overlapping spectral band within a spectrum of the first wideband analog RF signal. A second narrowband analog RF signal of the two narrowband analog RF signals that occupies a second non-overlapping spectral band within a spectrum of the first wideband analog RF signal.

The first cross-connect 610 is configured to electrically connect the output of the first amplifier 602 to the first input of the first down converter module 618 and to the first input of the second down converter module 622. The second cross-connect 654 is configured such that its first pair of outputs is electrically connected to the first pair of analog-to-digital converters 656*a*, 656*b* and its second pair of outputs is electrically connected to the second pair of analog-to-digital converters 658*a*, 658*b*.

The local oscillator selector 632 is configured to electrically connect, by 634, the first clock signal generated by the first local oscillator 624 to the input of the first phase shifter 644 of the first down converter module 618 and to electrically connect, by 636, the second clock signal generated by the second local oscillator 626 to the input of the second phase shifter 652 of the second down converter module 622. The first local oscillator 624 is tuned to a center frequency of the first non-overlapping spectral band and the second local oscillator 626 is tuned to a center frequency of the second non-overlapping spectral band.

In operation, the first amplifier 602 receives the first wideband analog RF signal and amplifies the first wideband analog RF signal. The amplified first wideband analog RF signal is then provided by the first cross-connect 610 to both the first and second down converter modules 618, 622 to separate the first and second narrowband analog RF signals from the first wideband analog RF signal. The first and second narrowband analog RF signals are separated from the wideband analog RF signal as follows. The first down converter module 618 receives the first wideband analog RF from the first amplifier 602 via 608, 616. A first mixer 638*a* of the first pair of mixers 638*a*, 638*b* multiplies the first wideband analog RF signal with the first in-phase signal received from the first phase shifter 644 to generate a first in-phase baseband signal. A second mixer 638*b* of the first pair of mixers 638*a*, 638*b* also multiplies the first wideband analog RF signal with the first quadrature signal received from the first phase shifter 644 to generate a first quadrature baseband signal. The first in-phase baseband signal and first quadrature baseband signal together form a first pair of orthogonal baseband signals.

The second down converter module 622 receives the first wideband analog RF from the second amplifier 604 via 614, 620. A first mixer 646*a* of the second pair of mixers 646*a*, 646*b* multiplies the first wideband analog RF signal with the second in-phase signal received from the second phase shifter 652 to generate a second in-phase baseband signal. A second mixer 646*b* of the second pair of mixers 646*a*, 646*b* also multiplies the first wideband analog RF signal with the second quadrature signal received from the second phase shifter 652 to generate a second quadrature baseband signal. The second in-phase and second quadrature baseband signals together form a second pair of orthogonal baseband signals.

The first pair of orthogonal baseband signals is provided by the first pair of mixers 638*a*, 638*b* to the first pair of amplifiers 640*a*, 640*b*. The first pair of amplifiers 640*a*, 640*b* amplify the first pair of orthogonal baseband signals and provide the first pair of amplified orthogonal baseband signals to the first pair of filters 642*a*, 642*b*, which filter or separate the first pair of amplified orthogonal baseband signals corresponding to the first narrowband analog RF signal occupying the first non-overlapping spectral band. The first pair of filtered orthogonal baseband signals includes a first filtered in-phase baseband analog signal and a first filtered quadrature baseband analog signal. The first pair of filtered orthogonal baseband signals is provided by the first pair of filters 642*a*, 642*b* to the first pair of inputs of the second cross-connect 654.

Similarly, the second pair of orthogonal baseband signals is provided by the second pair of mixers 646*a*, 646*b* to the first pair of amplifiers 648, 648*b*. The second pair of amplifiers 648*a*, 648*b* amplify the second pair of orthogonal baseband signals and provide the second pair of amplified orthogonal baseband signals to the second pair of filters 650*a*, 650*b*, which filter out or separate the second pair of amplified orthogonal baseband signals corresponding to the second narrowband analog RF signal occupying the second non-overlapping spectral band within the spectrum of the first wideband analog RF signal. The second pair of filtered orthogonal baseband signals includes a second filtered in-phase baseband analog signal and a second filtered quadrature baseband analog signal. The second pair of filtered orthogonal baseband signals are provided by the second pair of filters 650*a*, 650*b* to the second pair of inputs of the second cross-connect 654.

The first pair of inputs of the second cross-connect 654 are electrically connected to the first pair of ADCs 656*a*, 656*b* and the second pair of inputs of the second cross-connect 654 are connected to the second pair of ADCs 658*a*, 658*b*. The first pair of ADCs 656*a*, 656*b* receives the first pair of filtered baseband orthogonal signals and converts the first pair of filtered baseband orthogonal signals to a first pair of digital signals using the clock signal provided on 660 by the clock generator 662. Similarly, the second pair of ADCs 658*a*, 658*b* receives the second pair of filtered orthogonal baseband signals and converts the second pair of filtered orthogonal baseband signals to a second pair of digital signals using the clock signal provided on 660 by the clock generator 662. Both the first and second pair of digital signals are provided by the analog-to-digital conversion system 600 for further processing as is known in the art. The clock signal provided by on 660 the clock generator 662 samples the first and second pairs of filtered baseband orthogonal signals at two to five times the bandwidth of the first and second non-overlapping spectral bands, respectively.

Another example of the operation of the analog-to-digital converter system 600 will now be described. In this example, the analog-to-digital conversion system 600 receives two wideband analog RF signals, where each wideband analog RF signal includes one narrowband analog RF signal. A first narrowband analog RF signal occupies a first non-overlapping spectral band within a spectrum of the first wideband analog RF signal and a second narrowband analog RF signal occupies a second non-overlapping spectral band within a spectrum of the second wideband analog RF signal.

The first cross-connect 610 is configured to electrically connect the output of the first amplifier 602 to the first input of the first down converter module 618 and to electrically connect the output of the second amplifier 604 to the first input of the second down converter module 622. The second cross-connect 654 is configured such that its first pair of outputs are electrically connected to the first pair of analog-to-digital converters 656a, 656b and its second pair of outputs is electrically connected to the second pair of analog-to-digital converters 658a, 658b.

The local oscillator selector 632 is configured to electrically connect, by 634, the first clock signal generated by the first local oscillator 624 to the input of the first phase shifter 644 of the first down converter module 618 and to electrically connect, by 636, the second clock signal generated by the second local oscillator 626 to the input of the second phase shifter 652 of the second down converter module 622. The first local oscillator 624 is tuned to a center frequency of the first non-overlapping spectral band and the second local oscillator 626 is tuned to a center frequency of the second non-overlapping spectral band.

In operation, the first amplifier 602 receives the first wideband analog RF signal and amplifies the first wideband analog RF signal. The first amplified wideband analog RF signal is then provided by the first cross-connect 610 to the first converter module 618 to separate the first narrowband analog RF signal from the first wideband analog RF signal. The second amplifier 604 receives the second wideband analog RF signal. The second amplified wideband analog RF signal amplifies is the provided by the first cross-connect 610 to the second converter module 622 to separate the second narrowband analog RF signal from the second wideband analog RF signal.

The first and second narrowband analog RF signals are separated from the first and second wideband analog RF signals, respectively, as follows. The first down converter module 618 receives the first amplified wideband analog RF from the first amplifier 602 via 608, 616. A first mixer 638a of the first pair of mixers 638a, 638b multiplies the first wideband analog RF signal with the first in-phase signal received from the first phase shifter 644 to generate a first in-phase baseband signal. A second mixer 638b of the first pair of mixers 638a, 638b also multiplies the first amplified wideband analog RF signal with the first quadrature signal received from the first phase shifter 644 to generate a first quadrature baseband signal. The first in-phase and first quadrature baseband signals together form a first pair of orthogonal baseband signals.

The second down converter module 622 receives the second amplified wideband analog RF from the second amplifier 604 via 614, 620. A first mixer 646a of the second pair of mixers 646a, 646b multiplies the second amplified wideband analog RF signal with the second in-phase signal received from the second phase shifter 652 to generate a second in-phase baseband signal. A second mixer 646b of the second pair of mixers 646a, 646b also multiplies the second amplified wideband analog RF signal with the second quadrature signal received from the second phase shifter 652 to generate a second quadrature baseband signal. The second in-phase and second quadrature baseband signals together form a second pair of orthogonal baseband signals.

The first pair of orthogonal baseband signals is provided by the first pair of mixers 538a, 538b to the first pair of amplifiers 640a, 640b. The first pair of amplifiers 640a, 640b amplify the first pair of orthogonal baseband signals and provide the first pair of amplified orthogonal baseband signals to the first pair of filters 642a, 642b, which filter or separate the first pair of amplified orthogonal baseband signals corresponding to the first narrowband analog RF signal occupying the first non-overlapping spectral band within the spectrum of the first wideband analog RF signal. The first pair of filtered orthogonal baseband signals includes a first filtered in-phase baseband analog signal and a first filtered quadrature baseband analog signal. The first pair of filtered orthogonal baseband signals is provided by the first pair of filters 642a, 642b to the first pair of inputs of the second cross-connect 654.

Similarly, the second pair of orthogonal baseband signals is provided by the second pair of mixers 646a, 646b to the first pair of amplifiers 648, 648b. The second pair of amplifiers 648a, 648b amplify the second pair of orthogonal baseband signals and provide the second pair of amplified orthogonal baseband signals to the second pair of filters 650a, 650b, which filter out or separate the second pair of amplified orthogonal baseband signals corresponding to the second narrowband analog RF signal occupying the second non-overlapping spectral band within the spectrum of the second wideband analog RF signal. The second pair of filtered orthogonal baseband signals includes a second filtered in-phase baseband analog signal and a second filtered quadrature baseband analog signal. The second pair of filtered orthogonal baseband signals are provided by the second pair of filters 650a, 650b to the second pair of inputs of the second cross-connect 654.

The first pair of inputs of the second cross-connect 654 are electrically connected to the first pair of ADCs 656a, 656b and the second pair of inputs of the second cross-connect 654 are connected to the second pair of ADCs 658a, 658b. The first pair of ADCs 656a, 656b receives the first pair of filtered baseband orthogonal signals and coverts the first pair of filtered baseband orthogonal signals to a first pair of digital signals using the clock signal provided on 660 by the clock generator 662. Similarly, the second pair of ADCs 658a, 658b receives the second pair of filtered orthogonal baseband signals and converts the second pair of filtered orthogonal baseband signals to a second pair of digital signals using the clock signal provided on 660 by the clock generator 662. Both the first and second pair of digital signals are provided by the analog-to-digital conversion system 600 for further processing as is known in the art. The clock signal provided by the clock generator 662 samples the first and second pairs of filtered baseband orthogonal signals at two to five times the bandwidth of the first and second non-overlapping spectral bands, respectively.

Advantageously, the method and system of the present disclosure enable a single RF transceiver to efficiently convert wideband analog RF signals between the analog and digital domains. In an embodiment, the analog-to-digital converters of the single RF transceiver track the occupied bandwidth of a plurality of narrowband analog RF signals rather than a total bandwidth of the wideband analog RF signal. This enables the system of the present disclosure to have a smaller form factor, to consume less power, and to be cheaper to manufacture than the known systems used in multiband and multicarrier receivers.

Embodiments of the disclosure may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A method comprising:
   receiving a first wideband analog RF signal, wherein:
      the first wideband analog RF signal comprises one or more first narrowband analog RF signals, and
      a total of bandwidths of the one or more first narrowband analog RF signals is less than a total bandwidth of the first wideband analog RF signal;
   selecting a first subset of analog-to-digital converters (ADCs) from a plurality of analog-to-digital converters (ADCs), wherein a number of ADCs in the first subset of ADCs is less than a total number of ADCs in the plurality of ADCs;
   enabling only the first subset of ADCs, such that all remaining ADCs in the plurality of ADCs are not enabled; and
   analog-to-digital converting, via the first subset of ADCs, only to the one or more first narrowband analog RF signals, such that a remainder of the first wideband analog RF signal is not converted.

2. The method of claim 1, comprising separating the one or more first narrowband analog RF signals from the first wideband analog RF signal, wherein the separating comprises:
   down-converting the first wideband analog RF signal to first pairs of orthogonal baseband analog signals using a set of down-conversion frequencies, wherein each down-conversion frequency is tuned to a center frequency of one of the distinct non-overlapping spectral bands; and
   filtering the first pairs of orthogonal baseband analog signals to generate first pairs of filtered orthogonal baseband analog signals, each of the first pairs of filtered orthogonal baseband analog signals corresponding to one of the distinct narrowband analog RF signals.

3. The method of claim 2, wherein the analog-to-digital converting comprises converting each of the first pairs of filtered orthogonal baseband analog signals to pairs of digital signals.

4. The method of claim 2, wherein the down-converting comprises amplifying each of the first pairs of orthogonal baseband analog signals.

5. The method of claim 4, wherein the filtering comprises filtering the first pairs of amplified orthogonal baseband analog signals to generate the first pairs of filtered orthogonal baseband analog signals.

6. The method of claim 2, wherein the first pairs of orthogonal baseband signals comprise a first in-phase baseband signal and a first quadrature baseband signal.

7. The method of claim 1, comprising:
   receiving a second wideband analog RF signal, wherein:
      the second wideband analog RF signal comprises one or more second narrowband RF analog signals, and
      the first and second wideband analog RF signals are spectrally non-overlapping; and
   selecting a second subset of analog-to-digital converters (ADCs) from the plurality of ADCs to perform analog-to-digital conversion of only the one or more second narrowband RF analog signals; and
   enabling only the second subset of ADCs, such that each remaining ADC in the plurality of ADCs outside of the first and second subsets is not enabled.

8. The method of claim 7, wherein the analog-to-digital converting of only the one or more second narrowband analog RF signals comprises separating the one or more second narrowband analog RF signals from the second wideband analog RF signal.

9. The method of claim 8, wherein the separating of the one or more second narrowband analog RF signals from the second wideband analog RF signal comprises:
   down-converting the second wideband analog RF signal to second pairs of orthogonal baseband analog signals using a set of down-conversion frequencies, wherein each down-conversion frequency is tuned to a center frequency of one of the distinct non-overlapping spectral bands; and
   filtering the second pairs of orthogonal baseband analog signals to generate pairs of filtered orthogonal baseband analog signals, wherein each pair of filtered orthogonal baseband analog signals corresponding to one of the distinct narrowband analog RF signals.

10. A system comprising:
    a first receiving circuit operable to receive a first wideband analog RF signal, wherein:
       the first wideband analog RF signal comprises one or more first narrowband analog RF signals; and
       a total of bandwidths of the one or more first narrowband analog RF signals is less than a total bandwidth of the first wideband analog RF signal;
    a plurality of analog-to-digital converters (ADCs); and
    a controller circuit operable to:
       select a first subset of analog-to-digital converters (ADCs) from the plurality of ADCs, wherein a number of ADCs in the first subset of ADCs is less than a total number of ADCs in the plurality of ADCs; and enable only the first subset of ADCs, such that all remaining ADCs in the plurality of ADCs are not enabled;

wherein the first subset of ADCs is operable to analog-to-digital convert only the one or more first narrowband analog RF signals, such that a remainder of the first wideband analog RF signal is not converted.

11. The system of claim 10, comprising one or more down-converters, wherein each down-converter being tunable to a particular down-conversion frequency, the one or more down-converters are operable to down-convert the first wideband analog RF signal to first pairs of orthogonal baseband analog signals using a set of down-conversion frequencies, wherein each down-conversion frequency is tuned to a center frequency of one of the distinct non-overlapping spectral bands.

12. The system of claim 11, comprising one or more filters operable to filter the first pairs of orthogonal baseband analog signals to generate first pairs of filtered orthogonal baseband analog signals, wherein each of the first pairs of filtered orthogonal baseband analog signals corresponding to one of the distinct narrowband analog RF signals.

13. The system of claim 12, wherein the first subset of ADCs is operable to, when analog-to-digital converting the one or more first narrowband analog RF signals, convert each of the first pairs of filtered orthogonal baseband analog signals to pairs of digital signals.

14. The system of claim 12, comprising one or more amplifiers operable to amplify each of the first pairs of orthogonal baseband analog signals to generate first pairs of amplified orthogonal baseband analog signals.

15. The system of claim 14, wherein the one or more down-converters are operable to filter the first pairs of amplified orthogonal baseband analog signals to generate the first pairs of filtered orthogonal baseband analog signals.

16. The system of claim 10, comprising:
a second receiving circuit operable to receive a second wideband analog RF signal, wherein:
the second wideband analog RF signal comprises one or more second narrowband RF analog signals, and
the first and second wideband analog RF signals are spectrally non-overlapping; and wherein the controller circuit is operable to:
select a second subset of analog-to-digital converters (ADCs) from the plurality of ADCs to analog-to-digital convert only the one or more second narrowband RF analog signals; and
enable only the second subset of ADCs, such that each remaining ADC in the plurality of ADCs outside of the first and second subsets is not enabled.

17. The system of claim 16, comprising one or more down-converters, wherein each down-converter being tunable to a particular down-conversion frequency, the one or more down-converters are operable to down-convert the second wideband analog RF signal to second pairs of orthogonal baseband analog signals using a set of down-conversion frequencies, wherein each down-conversion frequency is tuned to a center frequency of one of the distinct non-overlapping spectral bands.

18. The method of claim 17, comprising one or more filters operable to filter the second pairs of orthogonal baseband analog signals to generate pairs of filtered orthogonal baseband analog signals, wherein each pair of filtered orthogonal baseband analog signals corresponding to one of the distinct narrowband analog RF signals.

19. The system of claim 10, comprising a connecting circuit operable to connect one or more of the plurality of ADCs to any one or more other circuits in the system.

20. The system of claim 19, wherein the connecting circuit is operable to connect one or more of the plurality of ADCs to any one of a plurality of down-converters to analog-to-digital convert only the first narrowband analog RF signals occupying the distinct non-overlapping spectral bands while not analog-to-digital converting the remainder of the first wideband analog RF signal.

* * * * *